United States Patent [19]

Kidder

[11] 3,985,714

[45] Oct. 12, 1976

[54] POLYAMIDATION PROCESS BY MAINTAINING TEMPERATURE AND PRESSURE DIFFERENTIAL CONTROLS

[75] Inventor: David Roy Kidder, Seaford, Del.

[73] Assignee: E. I. Du Pont de Nemours and Company, Wilmington, Del.

[22] Filed: Sept. 23, 1974

[21] Appl. No.: 508,666

Related U.S. Application Data

[63] Continuation-in-part of Ser. No. 324,504, Jan. 17, 1973, abandoned.

[52] U.S. Cl. .............................................. 260/78 R
[51] Int. Cl.² ........................................ C08G 69/28
[58] Field of Search ................................... 260/78 R

[56] References Cited

UNITED STATES PATENTS

| 3,493,345 | 2/1970 | Windley | 260/78 R |
| 3,503,937 | 3/1970 | Allen et al. | 260/78 R |
| 3,746,693 | 7/1973 | Gupta et al. | 260/78 R |

*Primary Examiner*—Harold D. Anderson

[57] ABSTRACT

A process is disclosed for controlling the dyeability of continuous polyamide filaments during their preparation by observing the pressure differential in the transfer line between the finisher and the spinnerets and adjusting the temperature in the evaporator apparatus to compensate for any fluctuation in pressure drop.

5 Claims, 1 Drawing Figure

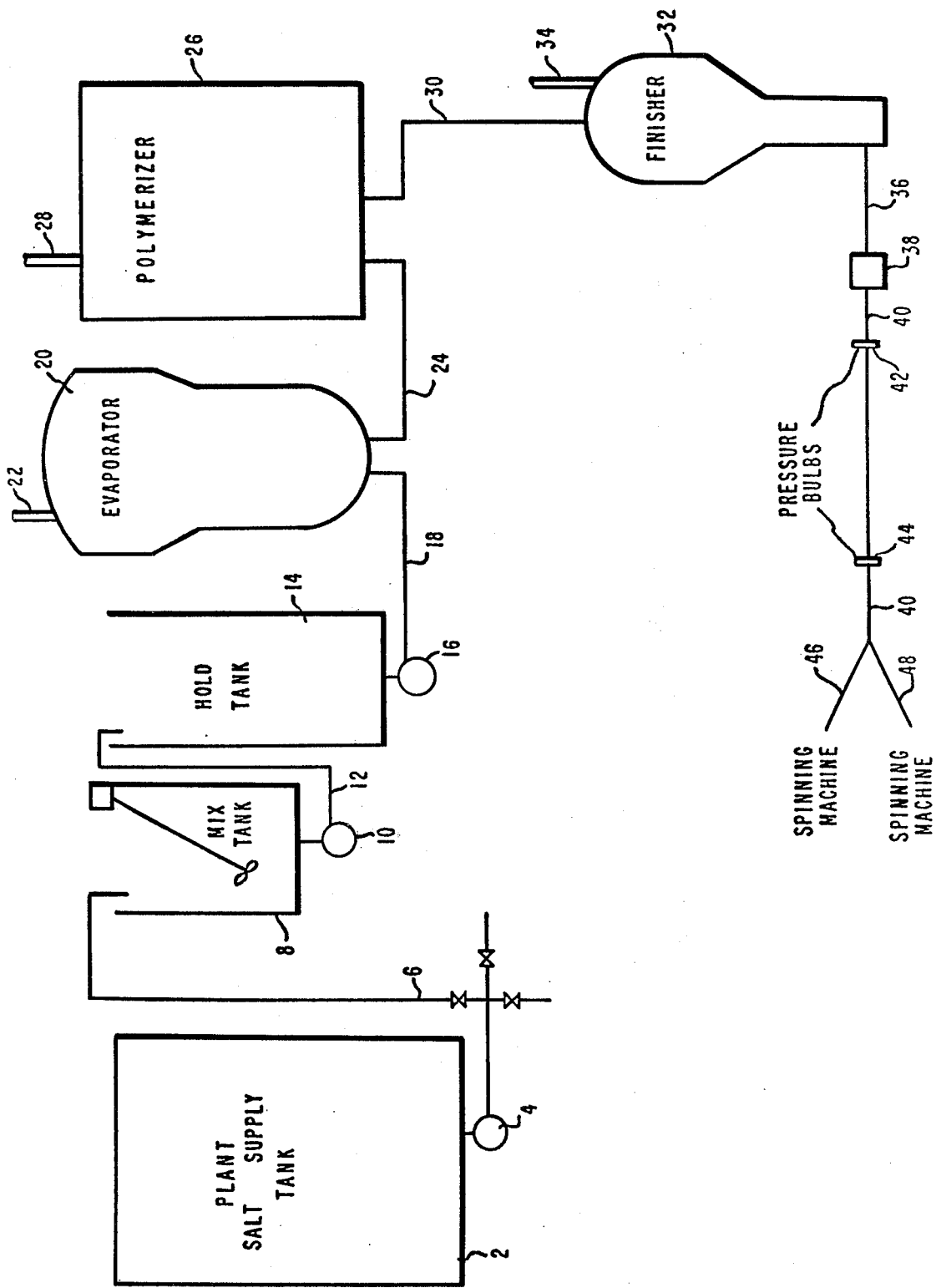

POLYAMIDATION PROCESS BY MAINTAINING TEMPERATURE AND PRESSURE DIFFERENTIAL CONTROLS

CROSS REFERENCE

This application is a continuation-in-part of my copending application Ser. No. 324,504, filed Jan. 17, 1973, now abandoned.

BACKGROUND OF THE INVENTION

This invention relates generally to a process for continuously polymerizing a diamine-dicarboxylic acid salt and extruding the resulting polyamide into fibers. More particularly, it involves the control of properties in polyamide fibers through adjustment of process variables.

The continuous preparation of polyamides is known and is described, e.g., in Taylor, U.S. Pat. No. 2,361,717 and Bryan, U.S. Pat. No. 3,357,955. Generally, an aqueous solution of a diamine-dicarboxylic acid salt is concentrated to the desired levels in an evaporator apparatus wherein water is removed. Next, additional water is removed while the salt solution is further concentrated and polymerized at amidation temperatures and pressures in a polymerizer apparatus. Then, the polymer is passed to a finisher apparatus where it is further polymerized and more water is removed. After leaving the finisher apparatus, the molten polymer is pumped through a transfer line (tube) to spinning machine manifolds where it is spun continuously into polyamide fibers.

In such a process, variables can cause undesirable changes in the properties of the final fibers which may not be measured until many pounds of polymer have been produced. Two such properties are dyeability and relative viscosity. An improved process has now been discovered for controlling the dyeability and relative viscosity of polyamide filaments produced from polymer containing unbalanced amine and carboxyl ends.

SUMMARY OF THE INVENTION

A filament is spun from a polyamide having an imbalance of acid and amine ends, as well as a relatively constant product of ends, by heating an aqueous solution of a diamine-dicarboxylic acid salt in an evaporator, passing the concentrated solution to a reactor operated at amidation temperature and pressure, passing the molten polyamide to a finisher, pumping it through a transfer line to a spinning machine, and spinning the finished polyamide into a continuous filament. The acid dyeability of the filament is controlled by monitoring the pressure differential in the transfer line, and either increasing the operating temperature of the evaporator incrementally to increase the number of amine ends in the finished polyamide as compensation for a predetermined decrease in the pressure differential, or decreasing the temperature of the evaporator incrementally to decrease the number of amine ends in the finished polyamide as compensation for a predetermined increase in the pressure differential.

DESCRIPTION OF THE DRAWING

The drawing is a schematic illustration of a continuous system suitable for use in practicing the present invention.

DESCRIPTION OF THE PREFERRED EMBODIMENT

As a diamine and a dicarboxylic acid polymerize to form a long chain polyamide, each end of each long chain formed will have either an amine group or an acid group which terminates the chain. Since fibers spun from such polyamides are conventionally dyed with acid dyes, their dyeability is affected by the number of amine ends present. Thus, in order to have good acid dye uniformity, a continuously spun polyamide filament should have a relatively constant concentration of amine ends.

The present invention is directed to the production of polyamides wherein each chain ends with carboxylic acid and/or amine ends and wherein the number of acid ends and the number of amine ends per million grams of polyamide are unbalanced and preferably differ by at least 3 and most preferably by at least 10 gram equivalents of ends. In a polyamide system having a constant product of ends, the viscosity will decrease as the difference between the ends increases. Since the slope of the curve describing this relationship between viscosity and end differences is flattest at the zero difference or balance point, and since equal changes from the balance point in the amount of a given end would produce the same change in the pressure drop, the invention is not applicable to polyamides having balanced or essentially balanced ends.

Suitable reactants for the diamine-dicarboxylic acid salt solution include tetramethylene, pentamethylene, octamethylene, and hexamethylene diamines, and sebacic, octadecanedioic, suberic, azelaic, glutaric, pimelic and adipic acids. Copolymers can be prepared from one or more of the above diamines with one or more of the above diacids and can also include isophthalic, terephthalic or epsilon-aminocaproic acid.

The process of the present invention leads to the production of polyamide yarns having good acid dyeing uniformity, and also relative viscosity of good uniformity. The process allows a relatively rapid response to ingredient changes that alter acid dyeability. Thus, the amount of product produced that falls outside of prescribed dyeability limits is greatly reduced by this invention. If changes in ingredients are not made until actual dye data is available, the time lag between the change and its measurement is so great that appreciable product is produced before corrective action can be taken. For instance, in producing a polyamide yarn having a relative viscosity of 61 ± 2 and a dyeability specification value of 180 from a polymer having 15 gram equivalents of amine ends and 98 gram equivalents of acid ends per million grams of polymer, the process is run to maintain the dyeability specification value within a range of ± 8% from the mean of 180. By using the differential pressure control system of this invention to adjust amine ends, the percentage of yarn produced which fell outside this range was reduced from the normal 20% all the way down to 5.3% and during this time the relative viscosity stayed within the range of 59–63.

The dyeability specification value is determined from reflectance numbers measured with a Colormaster Model 5 Reflectometer made by Meeco Manufacturing Company. These reflectance numbers normally are in the range from 13 to 18. Corrections are made in this value for variations in reflectance of the control yarn. The corrected value is multiplied by a constant determined by relating dyeability of the test yarn to that of the control yarn to give the dye specification value.

In accordance with the present invention, the dye uniformity of continuous filaments prepared from unbalanced polyamides can be controlled within a predetermined, desired range by measuring the pressure differential in the transfer line for, when the differential differs from a predetermined value, it indicates the dye level of the filament has changed sufficiently to affect uniformity. To change the differential, i.e., to bring it back within prescribed limits, the temperature of the evaporator is either raised or lowered in order to alter the amount of reacted diamine which adjusts the amine ends so that the pressure differential and dye uniformity return to desired levels. During this time, the pressure in the finisher is kept at a constant, low level to assist in keeping the relative viscosity within a prescribed, narrow range.

Referring now to the drawing, supply tank 2 is provided with an aqueous solution of a salt prepared from essentially equimolar amounts of hexamethylene diamine and adipic acid. Pump 4 forces this salt solution through pipe 6 to mixing tank 8 where it is mixed with a given amount of adipic acid per unit weight of salt. This acidified salt solution is then pumped by pump 10 through pipe 12 to holding tank 14. Holding tank 14 serves as the supply for evaporator 20 and is equipped with appropriate controls, not shown, to maintain the amount of liquid in the tank at a given level, except during the time when the salt in mix tank 8 is being mixed. A constant amount of the acidified salt solution is continuously removed from the hold tank 14 and pumped by pump 16 thorugh pipe 18 to evaporator 20. Evaporator 20 operates at a low pressure and an elevated temperature to concentrate the solution, the water being removed as steam through conduit 22. The concentrated salt then passes from evaporator 20 through pipe 24 to polymerizer 26. The polymerizer includes both a reactor and a flasher of the types disclosed by Bryan in U.S. Pat. No. 3,357,955. In the reactor, which is operated under elevated temperatures and pressures higher than those used in the evaporator, the salt solution is further concentrated and converted to polymer with the further removal of water which exits through conduit 28 as steam. More steam is liberated in the flasher, whence the polyamide passes through pipe 30 to finisher 32. Finisher 32 is operated at elevated temperatures and under a partial vacuum to further polymerize the polyamide by removal of small additional amounts of water which escape as steam through conduit 34. The polyamide passes from finisher 32 through pipe 36 to pump 38 which forces it through transfer line 40 to one or more spinning machine manifolds as at 46 and 48. Transfer line 40 is provided with pressure-sensing bulbs 42 and 44 for measuring the pressure drop (differential) in the transfer line between the bulbs. One bulb is installed adjacent the finisher apparatus outlet pump and the other is installed adjacent the spinning machine manifold. The pressure measured at bulb 42 is kept constant by regulating pump 38.

In practice, concentrating the salt solution in the evaporator is accompanied by a loss of the volatile diamine. Raising the temperature in the evaporator increases the loss of diamine while further increasing the concentration of the solution. However, in the polymerizer, where diamine is also lost in the removal of water, less diamine is lost the more concentrated is the salt solution from evaporator 20. Thus, an increase in temperature to further concentrate the salt solution results in a small increase in the amount of diamine lost in the evaporator which, in turn, results in a relatively larger decrease in the amount of diamine lost in the polymerizer.

The operable temperature range for the evaporator is from about 105° to about 180° C. In going from one extreme to the other, the operating pressure in the evaporator changes by about 60 psig. Within these limits, the temperature in the evaporator can be changed in small increments of 0.01°–5° C., preferably 0.01°–0.5° C. As a safeguard against overcontrol, the temperature should not be adjusted too frequently. For an incremental temperature change of 0.05° C., the preceding variation in pressure differential should be in the range of 5–10 psi. In the Example which follows, incremental temperature decreases of 0.05° C. were made as compensations for increases in pressure differential of 7.5 psig. The fluctuation in pressure drop which is indicative of a need for incremental temperature correction in the evaporator should be less than one tenth of the total pressure drop in the transfer line and at least within the sensitivity range of the instrumentation attached to bulbs 42, 44. The total effect of these adjustments is that an increase in the evaporator temperature results in an increased amount of diamine in the overall system, i.e., a net increase in amine ends.

The expression "relative viscosity" (RV) signifies the ratio of the flow time of a polymer solution in a viscometer to the flow time of the solvent by itself, measured in the same units at 25° C. The relative viscosity is determined using an 8.4 weight percent solution of polymer in a formic acid-water solution containing 90 weight percent formic acid.

The invention is further illustrated by the following example utilizing equipment similar to that referred to in the description of the drawing and wherein all percentages are percents by weight based on total weight.

EXAMPLE

An aqueous solution of hexamethylene diammonium adipate is prepared at a concentration of 51% and a pH of 7.2 and then pumped to a mixing tank where adipic acid is added at a rate to provide 100 lbs. excess of adipic acid per 8,000 gallons of salt. The acidified salt solution, having a pH of 6.9, is pumped to a hold tank a capacity of 12,000 gallons. Solution from the hold tank is supplied to an evaporator at a rate to provide a constant throughput of 1,000 gallons/hour of salt solution at the inlet. The evaporator is operated at a nominal temperature of 114° C. and a pressure of 4 psig., and is provided with controls capable of allowing the temperature to be changed in increments of 0.05° C. In the evaporator, the solution is concentrated by removal of water to a concentration of about 60–65%. The concentrated solution is then fed to a polymerizer which includes both a reactor operated at an exit temperature of 245° C. and a pressure of 250 psig and a flasher. The polyamide exiting from the flasher is fed to a finisher operating at a temperature of 282° C. and a pressure of about 2.3 psia. The polyamide throughput of the finisher is 4,200 lbs./hour, the hold-up time is 7 minutes and the polyamide has a moisture content of about 1.5 weight %. The polyamide is then pumped by gear pump through a transfer line to the manifold of a spinning machine. The transfer line is provided with two pressure bulbs with one being positioned at the pump discharge (about 2000 psig.) and the other at the spinning machine manifold (about 1000 psig.). The hold-up time between the exit of the evaporator and the pressure bulb located at the pump discharge is 3.5 hours. For practical considerations, the hold tank should contain a salt supply sufficient to last at least the length of this hold-up time and preferably to last at least three times this long. The temperature of the polymer in the transfer line is maintained at 291° C. and the pressure drop between the pressure bulbs is recorded on a chart having 25 lines to the inch and wherein 40 such lines represent 50 lbs./in.$^2$ of gauge pressure. The pressure drop is controlled at the desired level by adjusting the temperature of the evaporator as required. Temperature changes of 0.05° C. are made to induce a change of 6 chart units (7.5 psig.). A polyamide with 15–16 gram equivalents of amine ends and approximately 100 gram equivalents of carboxyl ends per million grams of polymer is produced. The finisher is operated at a pressure of 2.3 psia. and the evaporator is initially operated at a temperature of 114.3° C. The dyeability specification value of the first yarn produced is 175 versus a desired value of 180. The differential pressure stayed within the prescribed range of ± 7.5 psig. of the base point of 1,000 psig. in differential pressure for 9 hours and it was found that the dyeability specification value was maintained within the desired range. After 9 hours, the differential pressure rose to more than 7.5 psig. above the base point. To compensate for the change in dyeability that this would produce, the evaporator temperature was reduced by 0.05° C. Despite this temperature change, the pressure differential continued to increase and two additional 0.05° C. decreases in temperature were made at 45 minute intervals. (At the time of the last temperature decrease, the dyeability specification value of the filaments being produced was subsequently found to have increased from 175 to 192.) A 3.5 hour wait was required to establish the full effect of these changes, which proved to be insufficient and the differential pressure continued to increase. During the next 24.5 hours, additional temperature decreases in accordance with the above procedure were made in the evaporator temperature until it had been decreased to 113.95° C., a total change of 0.35° C. during the 48-hour period since the start of filament production. The pressure differential returned to a level within the prescribed range when the last adjustment of the evaporator temperature had taken full effect. Dye data subsequently obtained on the polymer produced showed a peak dyeability specification value of 200 and a return of 175 when the pressure differential returned to the prescribed range. The relative viscosity which had increased during the differential pressure increase returned to the desired level of 61 ± 2.

The foregoing detailed description has been given for clearness of understanding only and no unnecessary limitations are to be understood therefrom, e.g., although the example describes the preparation of an unbalanced polyamide having a larger number of acid ends than amine ends, it will be readily apparent that an unbalanced polyamide having a larger number of amine ends than acid ends can be prepared by the practice of this invention. The invention is not limited to the exact details shown and described for obvious modifications will occur to those skilled in the art.

Having thus described the invention, what is claimed as new and desired to be secured by Letters Patent is:

1. In a continuous process for preparing a filament from a polyamide having an imbalance of acid and amine ends, as well as a relative constant product of said ends, by heating at a constant throughput an aqueous solution of a salt comprised of nonequivalent proportions of diamine and dicarboxylic acid in an evaporator apparatus at a temperature of 105°–180° C. to concentrate it, passing the concentrated solution to a reactor where it is polymerized at amidation temperature and pressure, passing the molten polyamide produced to a finisher vessel where it is further polymerized, pumping the molten polyamide from the finisher vessel through a transfer line to a spinning machine, and spinning the finished polyamide into a continuous filament, the improvement which comprises controlling the acid dyeability level of the filament being spun by:

measuring the pressure differential in the transfer line, and maintaining the pressure differential within a range of ± 7.5 psig of the base point of 1000 psig. by increasing the temperature of the evaporator in increments of 0.05° C. to further concentrate the salt solution in the evaporator and to increase the number of amine ends in the finished polyamide as compensation for a decrease in the pressure differential, or decreasing the temperature of the evaporator in increments of 0.05° C. to decrease the number of amine ends in the finished polyamide as compensation for an increase in the pressure differential.

2. Process of claim 1 wherein the numbers of amine ends and carboxyl ends differ by at least 3 gram equivalents per million grams of the polyamide.

3. Process of claim 1 wherein the numbers of amine ends and carboxyl ends differ by at least 10 gram equivalents per million grams of the polyamide.

4. Process of claim 3 wherein the number of amine ends is less than the number of carboxyl ends.

5. The process of claim 1 wherein said salt comprises hexamethylene diamine and adipic acid.

* * * * *